3,759,848
PROCESS FOR THE PRODUCTION OF PRESSURE RESISTANT, HIGHLY HEAT RESISTANT FOAM PLASTICS MADE FROM MIXTURES OF A BITUMINOUS MASS AND A NOVOLAK
Jaafar Omran, Castrop-Rauxel, Heinz-Gerhard Franck, Duisburg-Meiderich, and Maximilian Zander, Castrop-Rauxel, Germany, assignors to Rutgerswerke Aktiengesellschaft, Frankfurt am Main, Germany
No Drawing. Filed Jan. 14, 1972, Ser. No. 217,962
Claims priority, application Germany, Jan. 18, 1971, P 21 02 118.1-43
Int. Cl. C08g 22/24
U.S. Cl. 260—2.5 F                    22 Claims

ABSTRACT OF THE DISCLOSURE

An improved process for the production of a pressure resistant and highly heat resistant foam plastic by simultaneously foaming and hardening a reaction mixture of a bituminous mass with a novolak, said foaming accomplished by means of gas liberated during said hardening process or by means of an added expanding agent, the improvement comprising simultaneously foaming and hardening a mixture of said bituminous mass with a modified novolak comprising the reaction product of a phenol, carbazol and formaldehyde. The foamed plastics are useful where pressure resistance and high heat resistance are required.

---

This invention relates to a process for the production of a pressure resistant, highly heat resistant foam plastic from mixtures of a bituminous mass and a novolak by simultaneous foaming and hardening caused by gases which are liberated during the hardening process or by added expanding agents.

German published application 1,620,847 discloses a process for the production of pressure resistant, highly heat resistant foam plastics from mixtures of bituminous masses and synthetic resins. This reference teaches that mixtures of bituminous masses and novolaks can be foamed and hardened simultaneously by gases liberated during the hardening process or by added expanding agents. The process is conducted at a temperature of 150 to 210° C., a viscosity of 50 to 5000 cp. and in the absence of a free acid.

By a short thermal pretreatment of the mixture of the bituminous mass, novolak and optional modifying agents, favorable conditions for the foaming and hardening process are established—viscosity of 50 to 5000 cp. at 150 to 210° C. and the absence of a free acid. The thermal pretreatment is at 280° to 350° C.

It now has been found that pressure resistant and highly heat resistant foam plastics can be produced without the necessity of subjecting the foaming mixture of the bituminous mass and novolak to a thermal pretreatment. This is accomplished in accordance with this invention by the use of a modified novolak.

According to this invention there is provided an improved process for the production of a pressure resistant and highly heat resistant foam plastic by simultaneously foaming and hardening a reaction mixture comprising a bituminous mass and a novolak. Foaming is accomplished by means of gas liberated during said hardening process or by means of an added expanding agent. The improvement comprises simultaneously foaming and hardening a mixture of the bituminous mass with a modified novolak. The modified novolak is a reaction product of a phenol, carbazol and formaldehyde.

The foaming and hardening process of this invention is preferably conducted at about 150–210° C. The bituminous mass can be any well-known bitumen, for example, natural asphalt or crude oil bitumina. Preferably, coal tars, lignite tars or wood tars are used. Coal tar pitches, lignite tar pitches, wood pitches or highly aromatic crude oil bitumina are particularly preferred. It will be understood that mixtures of any of the bituminous materials can be used. The bituminous mass is generally about 50–80% by weight, preferably about 65–75% by weight, calculated on the basis of the reaction mixture of the bituminous mass and modified novolak. The bituminous mass used in this invention generally has a softening point as measured by Kraemer-Sarnow (K.S.) of about 30–100° C. Preferably, a coal tar pitch having a softening point of about 60–85° C. is used.

During the foaming and hardening process of this invention, the modified novolak can be used in conjunction with the known novolak linking and expanding agents. Preferably, hexamethylene tetramine is used as a linking and expanding agent.

According to a preferred embodiment of this invention, the finished foam plastic is subjected to a thermal aftertreatment at about 200–300° C. for a period of about several hours. This aftertreatment further improves the pressure and heat resistant properties of the foamed plastic.

The mixture to be foamed can also contain conventional plastic fillers, such as talc, asbestos, soot, etc. The reaction mixture can also contain conventional modifying agents, such as polyethylene, polyvinylchloride, polystyrene or similar substances.

The modified novolaks used in the process of this invention are produced by subjecting a mixture consisting of a phenol component, a carbazol component and an aqueous formaldehyde solution to condensation in the presence of an acid. Preferably, oxalic acid is employed. After the condensation reaction, water and unconverted reactants are distilled from the modified novolak product. In preparing the modified novolak, pure carbazol with a content of about 97–100% can be used. In the alternative, technical carbozol of about 85–97% purity can be used. Also, a carbazol fraction containing about 50–85%, preferably about 70% by weight, carbazol can be used as the carbazol component. As the phenol component, phenol itself can be used. Also, m-cresol, technical cresol mixtures phenol-cresol mixtures, xylenol, or mixtures of these can be used. The molar ratio of carbazol:phenol is preferably about 1:2–1:5. Further, the molar ratio of phenol plus carbazol to formaldehyde is preferably about 1:0.5–1:1.5.

This invention will be more fully understood by reference to the following examples. All parts are by weight unless otherwise indicated.

EXAMPLE 1

(A) Preparation of modified novolak

A mixture of 1155 parts of phenol, 495 parts of carbazol fractions (carbazol content 73.6%) and 1269 parts of an aqueous 36% formaldehyde solution is heated until it boils. Subsequently, 17 parts of oxalic acid dissolved in 100 parts of water are added drop by drop. The mixture is kept for 5 hours and 15 minutes at a reaction temperature of 100° C. The water is then distilled at standard pressure within 2 hours and 22 minutes at a sump temperature of up to 130° C., and thereafter in the vacuum of the water jet pump within 19 minutes to a sump temperature of 148° C.

1765 parts of a clear, reddish brown, easily flowing resin are obtained as a residue, with a softening point (K.S.) of 102° C. and a content of 2% free phenol.

(B) Preparation of foamed plastic 400 parts of the previously described carbazol modified novolak and 600 parts of coal tar pitch (softening point 70° C. K.S.) are heated to 180° C. The foaming and hardening of the mass are brought about by an intensive stirring with 60 parts of hexamethylenetetramine.

The foam plastic that develops has a unit weight of 200 kg./m.$^3$. It has a heat distortion temperature of 300° C. and a pressure resistance of 24.2 kg./cm.$^2$, the latter according to DIN 53454 (German Standard).

EXAMPLE 2

300 parts of the carbazol modified novolak (from Example 1(A)) and 700 parts of coal tar pitch (softening point 70° C. K.S.) are heated to 180° C. The foaming and hardening of the mass are induced by means of intensive stirring with 60 parts of hexamethylenetetramine. The resulting foam plastic has a unit weight of 200 kg./m.$^3$ and a heat distortion temperature of 300° C.

EXAMPLE 3

500 parts of the carbazol modified novolak (from Example 1(A)) and 300 parts coal tar pitch (softening point 70° C. K.S.) as well as 200 parts of bitumin 95/15 are heated to 180° C. The foaming and hardening of the mass are induced by means of intensive stirring with 60 parts hexamethylenetetramine. The foam plastic has a unit weight of 190 kg./m.$^3$. It has a heat distortion temperature of 300° C. and a pressure resistance of 17 kg./cm.$^2$.

EXAMPLE 4

(A) Preparation of modified novolak

A mixture of 990 parts phenol, 660 parts carbazol fraction (carbazol content 73.6%) and 1207 parts of an aqueous 36% formaldehyde solution is heated until it boils. Subsequently 17 parts oxalic acid dissolved in 100 parts of water are added drop by drop within 45 minutes. This is kept for 5 hours and 15 minutes at a reaction temperature of about 100° C. Then the water is distilled at standard pressure within 2 hours and 20 minutes up to a sump temperature of 130° C. and afterwards in the vacuum of the water jet pump up to a sump temperature of 148° C. within 20 minutes.

1749 parts of a reddish brown, clear, easy flowing resin with a softening point (K.S.) of 102° C. and a content of 1.6% free phenol are obtained as residue.

(B) Preparation of foam plastic 400 parts of the carbazol modified novolak of Part A and 600 parts of coal tar pitch (softening point 70° C. K.S.) are heated to 180° C. The foaming and hardening of the mass are brought about by means of intensive stirring with 60 parts of hexamethylenetetramine. The resulting foam plastic has a unit weight of 180 kg./m.$^3$. It has a heat distortion temperature of 300° C. and a pressure resistance of 14.4 kg./cm.$^2$.

EXAMPLE 5

(A) Preparation of modified novolak

A mixture of 1320 parts of phenol, 330 parts of carbazol fraction (carbazol content 76.2%) and 1280.8 parts of an aqueous 36% formaldehyde solution is heated until it boils. Subsequently 17 parts of oxalic acid dissolved in 100 parts of water are added drop by drop within 45 minutes. The mixture is kept for 5 hours and 15 minutes at a reaction temperature of 100° C. Then the water is distilled at standard pressure within 2 hours and 5 minutes up to a sump temperature of 130° C., subsequently in the water jet pump vacuum up to a sump temperature of 156° C. within 17 minutes.

1782 parts of a reddish brown, clear, easy flowing resin with a softening point (K.S.) of 103° C. and a content of free phenol of 1.4% are obtained as residue.

(B) Preparation of foam plastic 400 parts of the carbazol modified novolak of Part A and 600 parts of coal tar pitch (softening point 70° C. K.S.) are heated to 185° C. The foaming and hardening of the mass are brought about by means of intensive stirring with 60 parts of hexamethylenetetramine. The foam plastic obtained has a unit weight of 200 kg./m.$^3$ and a heat distortion temperature of 300° C.

EXAMPLE 6

(A) Preparation of modified novolak

A mixture of 1155 parts of a cresol mix, 495 parts carbazol fraction (carbazol content 72.8%) and 1192 parts of 38.2% formaldehyde solution is heated until it boils. Subsequently 17 parts of oxalic acid dissolved in 100 parts of water are added drop by drop within 45 minutes. The mixture is kept for 5 hours 15 minutes at a reaction temperature of about 100° C. Then the water is distilled at standard pressure within 2 hours 30 minutes up to a sump temperature of 130° C., subsequently, in the water jet pump vacuum up to a sump temperature of 156° C. within 16 minutes.

1535 parts of a reddish brown, clear, viscous resin with a softening point (K.S.) of 120° C. and a content of free phenol of 1.4% are obtained as residue.

(B) Preparation of foam plastic 400 parts of the carbazol modified novolak of Part A and 600 parts of coal tar pitch (softening point 70° C. K.S.) are heated to 185° C. The foaming and hardening of the mass is brought about by means of intensive stirring with 60 parts hexamethylenetetramine. The foam plastic developed has a unit weight of 165 kg./m.$^3$ and a heat distortion temperature of 300° C., measured according to ASTM D1692.

We claim:

1. An improved process for the production of a pressure resistant and highly heat resistant foam plastic by simultaneously foaming and hardening a reaction mixture of a bituminous mass with a novolak, said foaming accomplished by means of gas liberated during hardening process or by means of an added expanding agent, the improvement comprising simultaneously foaming and hardening a mixture of said bituminous mass with a modified novolak comprising the reaction product of a phenol, carbazol and formaldehyde prepared with an organic carboxylic acid as a condensation agent and further wherein the carbazol component is in a molar ratio to said phenol component of about 1:2–1:5.

2. Process of claim 1 in which foaming and hardening are conducted at about 150–210° C.

3. Process of claim 1 in which said bituminous mass is a crude oil bitumina, coal tar, lignite tar or wood tar.

4. Process of claim 1 in which said bituminous mass is a coal tar pitch, lignite tar pitch, wood pitch or highly aromatic crude oil bitumina or mixtures of these bituminous materials, and further wherein these bituminous materials comprise about 50–80% by weight of said reaction mixture calculated on the basis of the bituminous mass and novolak.

5. Process of claim 4 in which said weight percent is about 65–75%.

6. Process of claim 1 in which the bituminous mass comprises a pitch having a Kraemer-Sarnow softening point of about 30–100° C.

7. Process of claim 6 in which said pitch is a coal tar pitch and said softening point is about 60–85° C.

8. Process of claim 1 in which hexamethylenetetramine is used as a hardening and expanding agent.

9. Process of claim 1 comprising thermally after-treating said plastic at about 200–300° C. for several hours.

10. Process of claim 1 in which a filler for said plastic is employed.

11. Process of claim 9 in which said filler is talc, asbestos or soot.

12. Process of claim 1 in which polyethylene, polyvinylchloride, or polystyrene is used as a modifying agent for said plastic.

13. Process of claim 1 in which said modified novolak is produced from phenol, a cresol or a xylenol or mixtures of these compounds with pure carbazol, technical carbazol or a carbazol fraction, and further wherein the carbazol is in a molar ratio to said phenol, said cresol and said xylenol of about 1:2–1:5.

14. Process of claim 1 in which said phenol, carbazol and formaldehyde are in a molar ratio of phenol plus carbazol:formaldehyde of about 1:0.5–1:1.5.

15. Process of claim 1 in which the carboxylic acid is oxalic acid.

16. Process of claim 2 in which said modified novolak is produced from a phenol component selected from the group consisting of phenol, cresol and xylenol or mixtures of these compounds with a carbazol component selected from the group consisting of pure carbazol of 97–100% purity, technical carbazol of about 85–97% purity and a carbazol fraction containing about 50–85% carbazol, and further wherein the carbazol component is in a molar ratio to said phenol component of about 1:2–1:5.

17. Process of claim 16 in which said phenol component, said carbazol component and said formaldehyde are in a molar ratio of phenol component plus carbazol component: formaldehyde of about 1:0.5–1:1.5.

18. Process of claim 17 in which oxalic acid is used as a condensation agent for the preparation of said modified novolak.

19. Process of claim 18 in which said bituminous mass is a coal tar pitch, lignite tar pitch, wood pitch or highly aromatic crude oil bitumina or mixtures of these bituminous materials, and further wherein these bituminous materials comprise about 65–75% by weight of said reaction mixture calculated on the basis of the bituminous mass and novolak, said bituminous mass having a Kraemer-Sarnow softening point of about 30–100° C.

20. Process of claim 19 in which said pitch is a coal tar pitch and said softening point is about 60–85° C.

21. Process of claim 20 in which hexamethylenetetramine is used as a hardening and expending agent.

22. Process of claim 21 comprising thermally aftertreating said plastic at about 200–300° C. for several hours.

References Cited

UNITED STATES PATENTS

| | | | |
|---|---|---|---|
| 3,207,687 | 9/1965 | Maier | 260—28 |
| 2,168,981 | 8/1939 | Flood et al. | 260—2.5 F |

OTHER REFERENCES

Chem. Abstracts, vol. 66, 11384h–11385A, Novitkov et. al.

JOHN C. BLEUTGE, Primary Examiner

M. FOELAK, Assistant Examiner

U.S. Cl. X.R.

260—28, 38, 51.5, 839, 847, 848